United States Patent [19]

Tillery

[11] 4,126,095
[45] Nov. 21, 1978

[54] TIE-DOWN FITTING

[76] Inventor: Thomas H. Tillery, 13371 Lee Dr., Westminster, Calif. 92683

[21] Appl. No.: 848,922

[22] Filed: Nov. 7, 1977

[51] Int. Cl.² .......................... B62C 9/00; F16G 11/00
[52] U.S. Cl. .................................... 105/475; 105/473; 280/179 A; 24/132 R
[58] Field of Search ......... 24/132 A, 132 R, 265 CD, 24/132; 280/179 A; 248/505; 105/473, 481, 475; 114/218

[56] References Cited

U.S. PATENT DOCUMENTS

| 258,608 | 5/1882 | Samson | 24/132 R |
|---|---|---|---|
| 295,799 | 3/1884 | Patton | 24/132 R |
| 521,056 | 6/1894 | Steelman | 24/132 R |
| 701,964 | 6/1902 | Taylor | 24/132 AA |
| 1,137,796 | 5/1915 | Seifert | 24/132 R |
| 2,555,805 | 6/1951 | Miller | 24/132 R |
| 3,257,971 | 6/1966 | Swendsen | 280/179 A |

Primary Examiner—Bernard A. Gelak
Attorney, Agent, or Firm—Fulwider, Patton, Rieber, Lee & Utecht

[57] ABSTRACT

A tie-down fitting comprising a body for attachment to fixed structure. The body includes a recess within which an elongated tang is pivotally fitted. A rope or line may be laid in transverse depressions in the body. One end of the tang can be pressed to project the opposite end above the transverse depressions. On release, the tang is biased toward the depressions to hold the line. A strain on the line moves the tang to its projected, tie-down position.

5 Claims, 4 Drawing Figures

TIE-DOWN FITTING

BACKGROUND OF THE INVENTION

1. Field of the Invention

The present invention relates to a tie-down fitting and more particularly to a tie-down fitting adapted to temporarily hold a line not under strain.

2. Description of the Prior Art

Numerous prior art tie-downs are adapted to provide places of securement for a rope or line stretched across an object to secure the object in position. On pick-up trucks and the like such tie-downs, sometimes also known as rope hooks or cleats, are attached about the periphery of the truck bed and provide anchorages for lines passing over objects carried on the truck bed. Such tie-downs are often bulky, expensive, or project and undesirably snag or catch upon other objects. Moreover, they are incapable of holding a line temporarily, preparatory to taking a strain on the line. For example, it is usually not possible to lay the securing line in one such tie-down without having it fall out before the line can be located in the tie-down on the other side of the truck. In a one man operation this can be prevented primarily only by keeping a slight strain on the line while it is being draped over the load on the truck bed, which is awkward and unhandy.

SUMMARY

According to the present invention, a tie-down fitting is provided which includes a body adapted for mounting in a relatively fixed position on a vehicle or the like. Although it works particularly well for securing loads in position upon the bed of a pick-up truck, it is also useful in marine applications, aircraft, and various other tie-down applications.

The body includes a stop surface and a pair of side portions spaced apart to define an elongated recess within which is pivotally mounted an elongated tang. The tang is movable between a recessed position and a holding position, in which one extremity of the tang is projected upwardly of a pair of transverse depressions in the body side portions and is adapted to withstand considerable strain from a line disposed underneath it.

The tang is biased toward its recessed position. Consequently, a line laid under the tang is held within the transverse depressions by this bias action. This enables the tie-down to temporarily clamp or hold a line until the user is able to locate the line in the next tie-down and take a strain on it, as would be the case in crisscrossing a line over the load on a pick-up truck bed between the tie-down fittings on opposite sides of the truck bed. The tie-down fitting thus serves as both a temporary clamp and as a tie-down.

Other objects and features of the invention will become apparent from consideration of the following description taken in connection with the accompanying drawings.

DESCRIPTION OF THE PREFERRED EMBODIMENT

Figure 1:
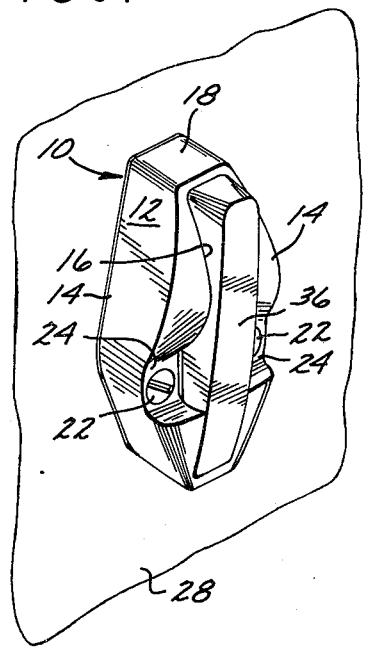
FIG. 1 is a perspective view of a tie-down fitting according to the present invention, with the tang in its recessed position.

Referring now to the drawings, there is illustrated a tie-down fitting 10 according to the present invention and comprising, generally, a body 12 having a pair of side portions 14 whose interiorly disposed, confronting surfaces define the side walls of an elongated recess 16. The side portions 16 are integrally joined by body portions whose opposite inner surfaces define the upper and lower end walls 18 and 20, respectively, of the recess 16.

The opposite outer ends of the body 12 are generally flat, while the outer sides of the body portions 14 diverge outwardly from both ends, providing a wider middle portion. This middle portion includes a pair of transversely spaced apart, counter sunk openings which receive a pair of fasteners such as machine screws 22 to mount the body in fixed position upon a supporting surface such as the side 28 of a pick-up truck bed. For a pick-up truck application, a plurality of the tie-down fittings 10 are attached on opposite sides 28 of the truck, and even to the end of the truck. This affords a number of anchorages or tie-down points with which the line 26 can be associated to secure objects on the truck bed. The end walls 18 of the fittings 10 would be disposed upwardly, as illustrated, in such an application.

As previously indicated, the fittings 10 are adapted for use in a number of applications and their description in association with a pick-up truck application is merely exemplary, as is their generally vertical orientation in such application.

Figure 2:
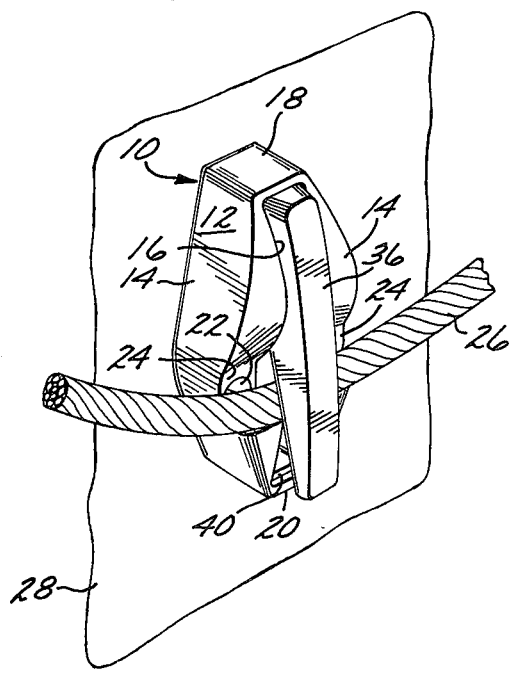
FIG. 2 is a perspective view similar to FIG. 1, but illustrating the tang temporarily clamping a line in position.

The body 12 is characterized by a pair of transversely aligned depressions 24 in the body side portions 14 adjacent the machine screw openings. These depressions 24 are adapted to receive the line 26, as best seen in FIG. 2.

The body 12 includes a base 30 which forms the bottom wall of the recess 16 adjacent the end wall 18. The upper surface of the base 30 defines a stop surface 32, as will be more particularly described later.

A resilient gasket 34 coextensive with the bottom surface of the body 12 is interposed between the body 12 and the truck side 18 to minimize marring of the side 18 and reduce rattling and similar vibration.

The fitting 10 includes an elongated lever, arm, or tang 36 located within the body recess 16 and having generally parallel sides which fit relatively close to the complemental, generally parallel walls of the recess 16.

Figure 3:
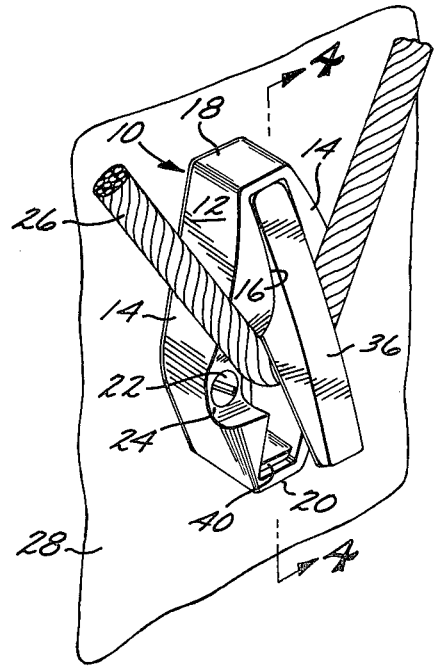
FIG. 3 is a perspective view similar to FIG. 1, but illustrating the tang in its projected position and supporting a line under heavy strain.

A stub shaft or pin 38 is disposed through suitable openings in the side portions 14 and in the tang 36. The pin 38 supports the tang 36 for pivotal movement between an inward or recessed position, as illustrated in FIG. 1, and an outward or holding position, as illustrated in FIG. 3.

The upper underside portion of the tang 36 is generally flat and engages the body stop surface 32 in the projected position of the tang 36 to constrain the tang against further outward pivotal movement and enable the tang to hold the line 26 under a heavy strain. In its recessed position the lower or free end of the tang 36 engages a second stop surface, step, or ledge 40 formed in the body end wall 20 of the body 12, at which point the outer surface of the tang end is flush with the adjacent outer surfaces of the side portions 14, as best seen in FIG. 1. This reduces any tendency of the tang to snag objects in its recessed, inoperative position.

In the recessed position of the tang 36, the upper extremity of the tang 36 projects above the adjacent surfaces of the side portions 14. This projecting portion can be pressed to pivot the tang 36 into the position illustrated in FIG. 2, enabling the line 26 to be placed under the tang and in the depressions 24. The tang 36 is biased toward its recessed position, for holding the line 26 in this position, by means of a compression spring 42. The spring 42 is disposed within a blind bore 44 provided in the underside of the upper extremity of the tang 36, the opposite ends of the spring 42 bearing against the base of the bore 44 and the stop surface 32, respectively.

Figure 4:
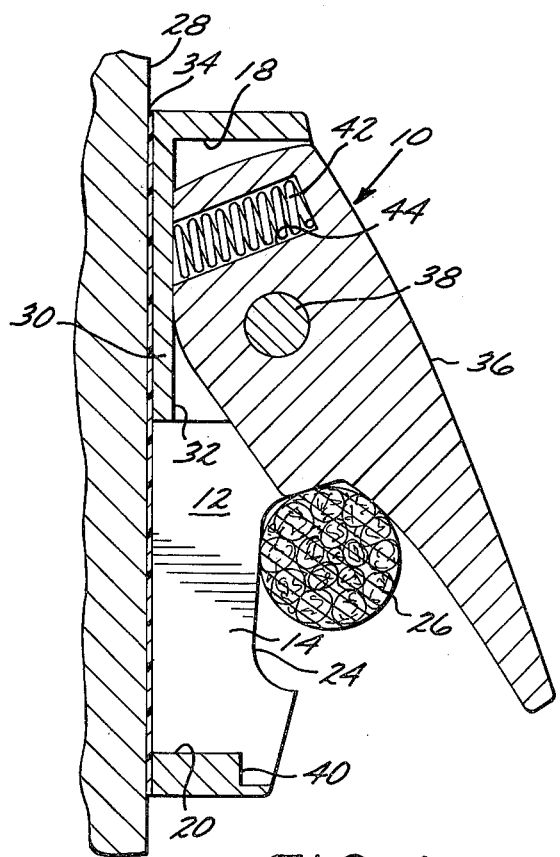
FIG. 4 is an enlarged view taken along the line 4—4 of FIG. 3.

In operation, the tang 36 is normally in the recessed position illustrated in FIG. 1. The user depresses the upper extremity of the tang 36 to pivot the opposite extremity of the tang 36 from between the depressions 24. The line 26 can then be laid in the depressions. Next, release of the tang 36 causes it to be biased against the line 26, temporarily holding it in position despite the absence of strain on the line 26. This permits the user to dispose the free end of the line 26 across the truck bed to an oppostely located tie-down fitting 10. A strain can then be taken on the line 26, pivoting the tang 36 of the first tie-down fitting 10 to the position illustrated in FIGS. 3 and 4.

Various modifications and changes may be made with regard to the foregoing detailed description without departing from the spirit of the invention.

I claim:

1. A tie-down fitting comprising:

a body including an undersurface adapted for mounting to a supporting surface, said body further including a stop surface and a pair of side portions projecting above said undersurface and spaced apart to define an elongated recess, said side portions including transversely aligned depressions;

an elongated tang pivotally mounted within said recess for movement between a recessed position, wherein one extremity of said tang is located between said depressions and the opposite extremity partially projects above said side portions, and a holding position, wherein said one extremity is spaced above said depressions and said opposite extremity is engaged upon said stop surface to constrain said tang against pivotal movement beyond said holding position, whereby a strain taken on a line placed in said depressions and beneath said one extremity of said tank tends to urge said opposite extremity against said stop surface; and means operative upon said body and said tang and biasing said tang toward said recessed position whereby said one extremity of said tang is adapted to press upon said line and hold it in said depressions despite the absence of a strain on said line.

2. A tie-down fitting according to claim 1 wherein said stop surface is defined by the base of said recess.

3. A tie-down fitting according to claim 1 wherein said one extremity of said tang is flush with said side portions in said recessed position of said tang.

4. A tie-down fitting according to claim 1 wherein said means comprises a compression spring interposed between said stop surface and said opposite extremity of said tang.

5. A tie-down fitting according to claim 1 wherein said body includes a second stop surface engaged by said one extremity in said recessed position of said tang.

* * * * *